INVENTOR.
WALTER W. BARNEY

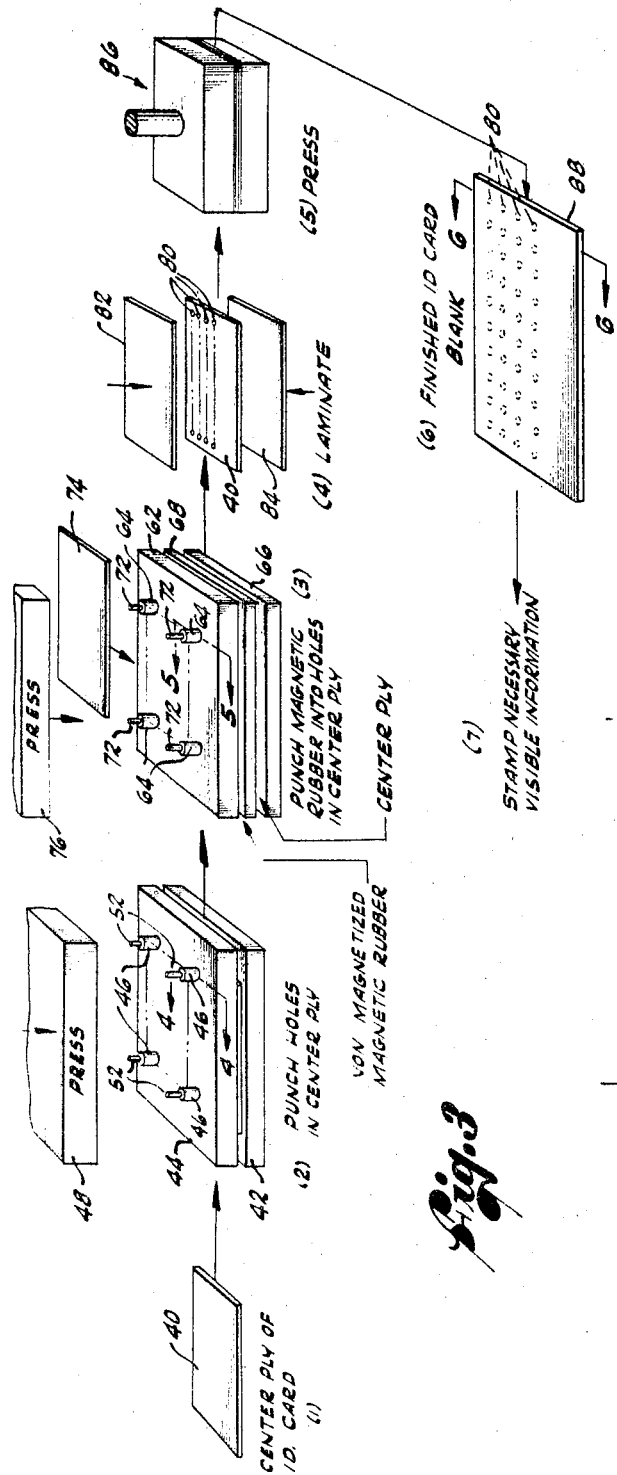

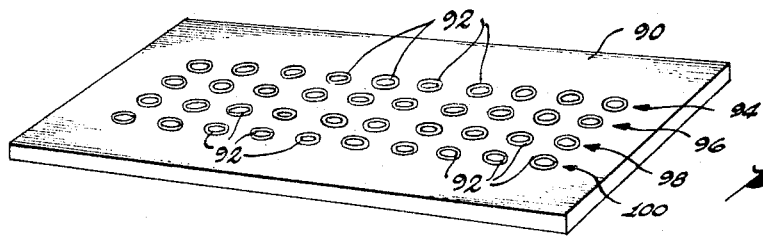
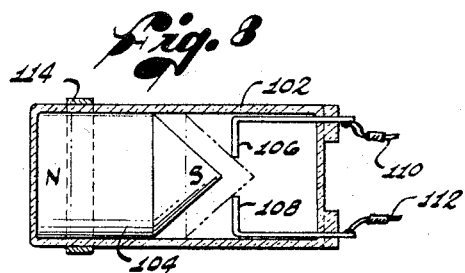
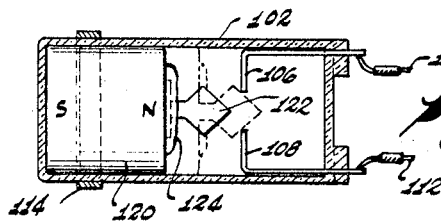
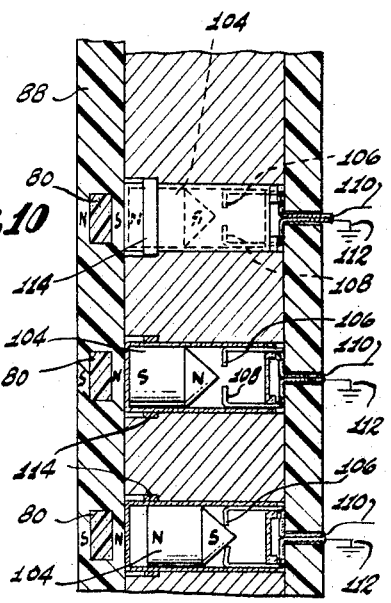
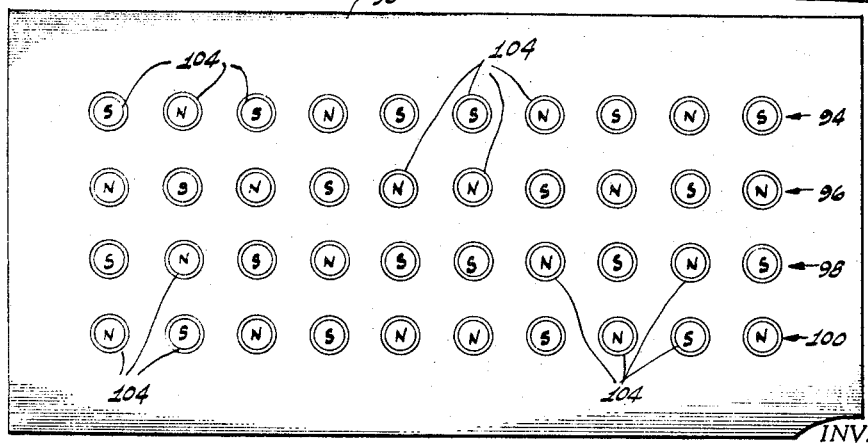

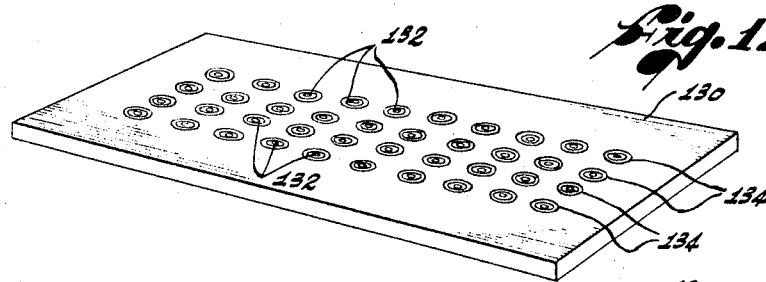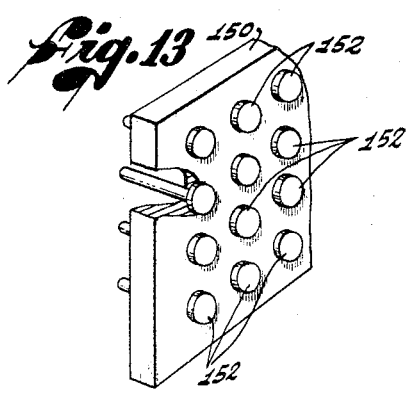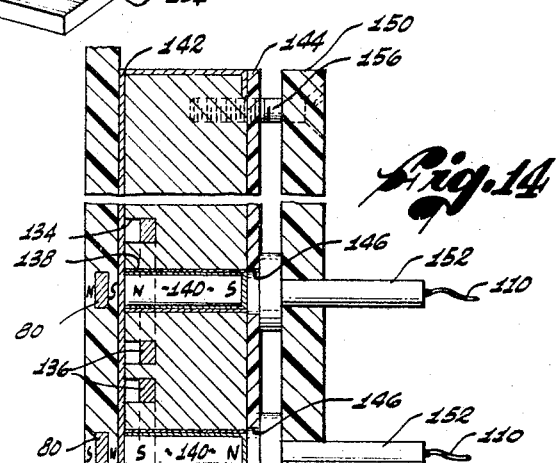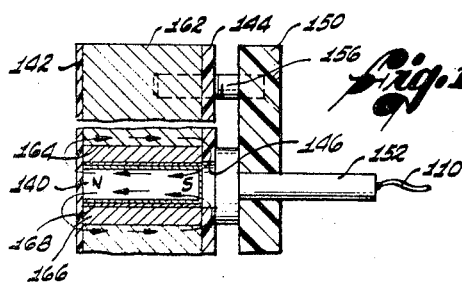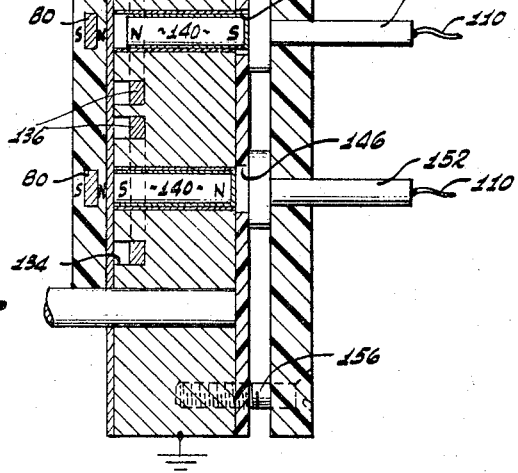

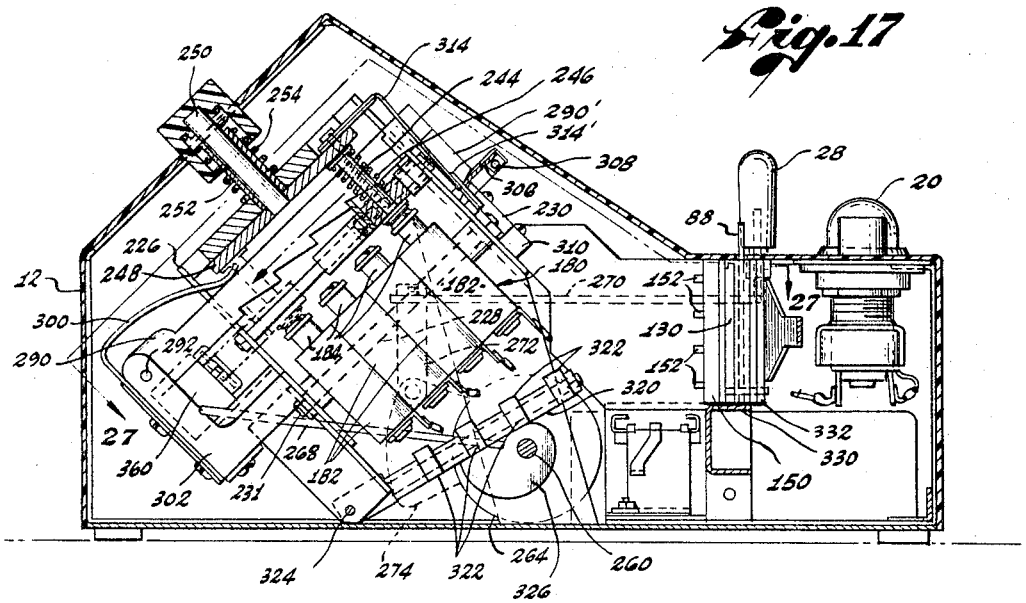
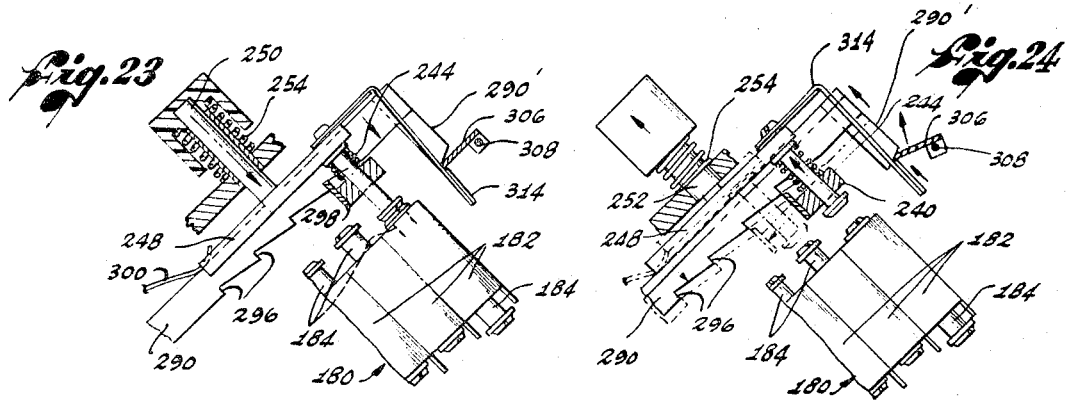
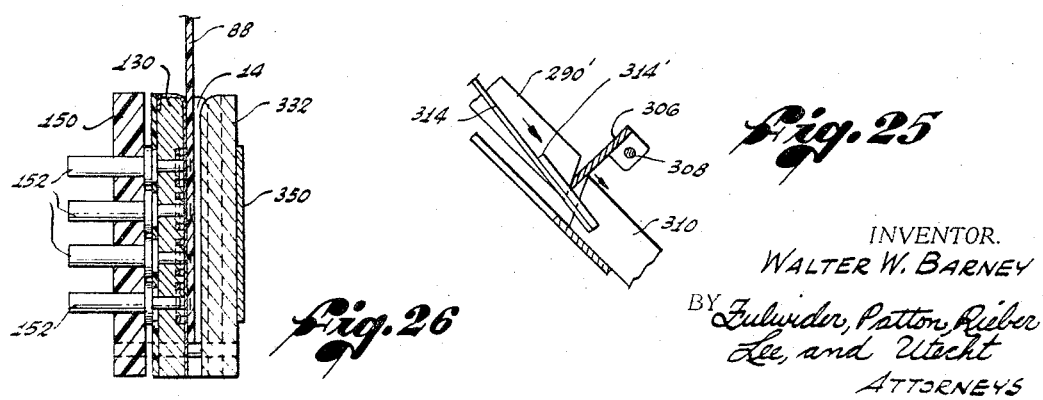

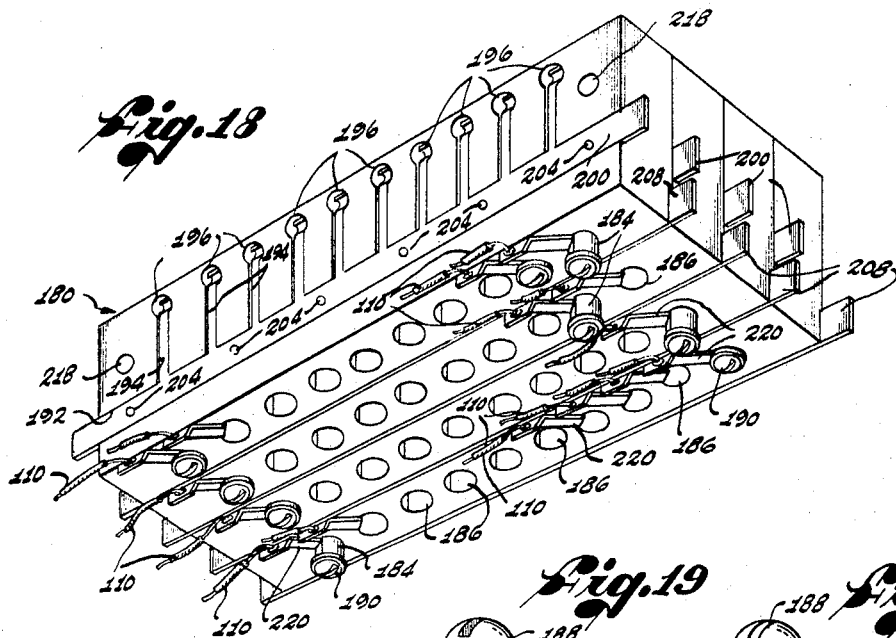
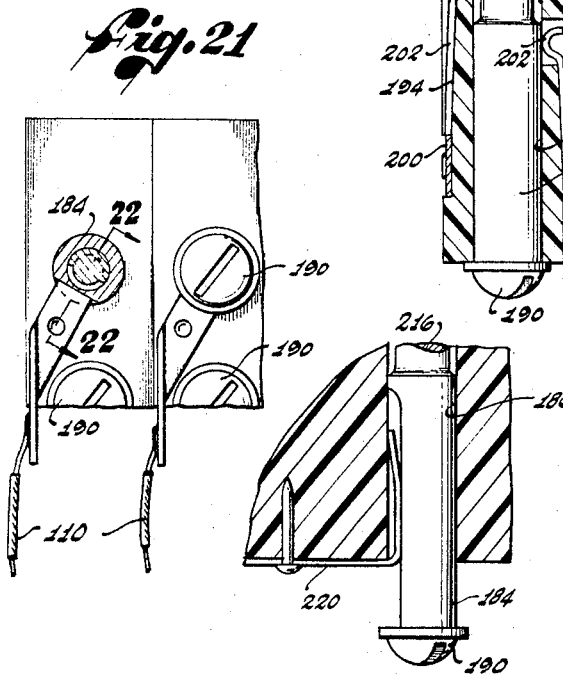

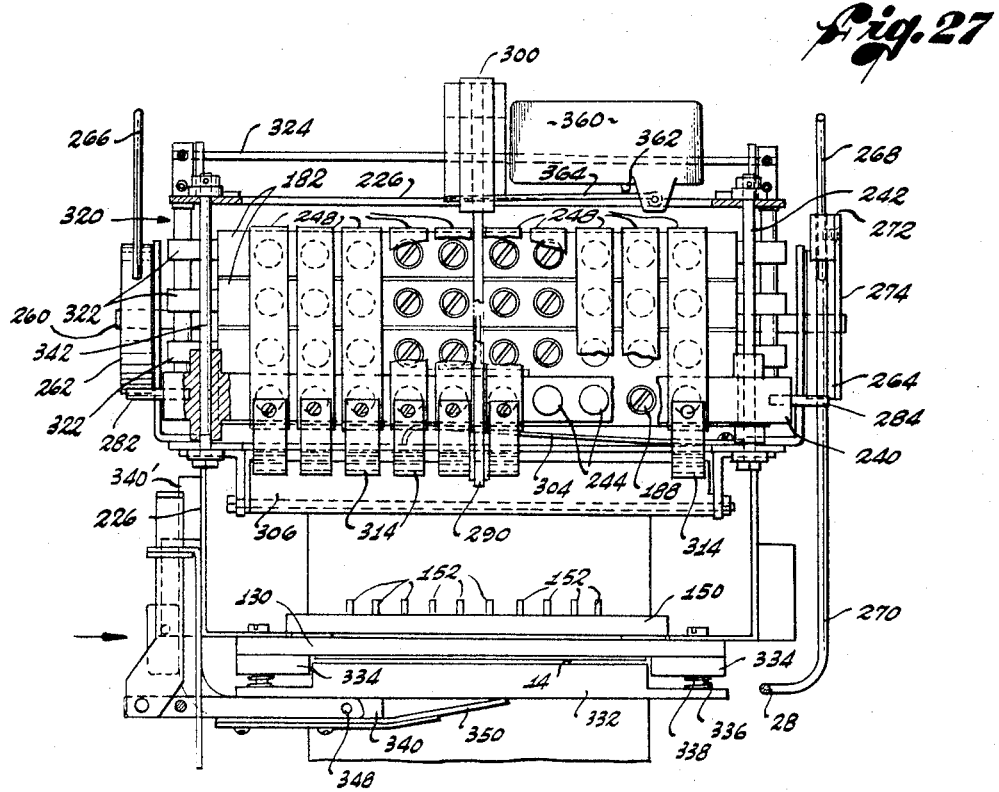
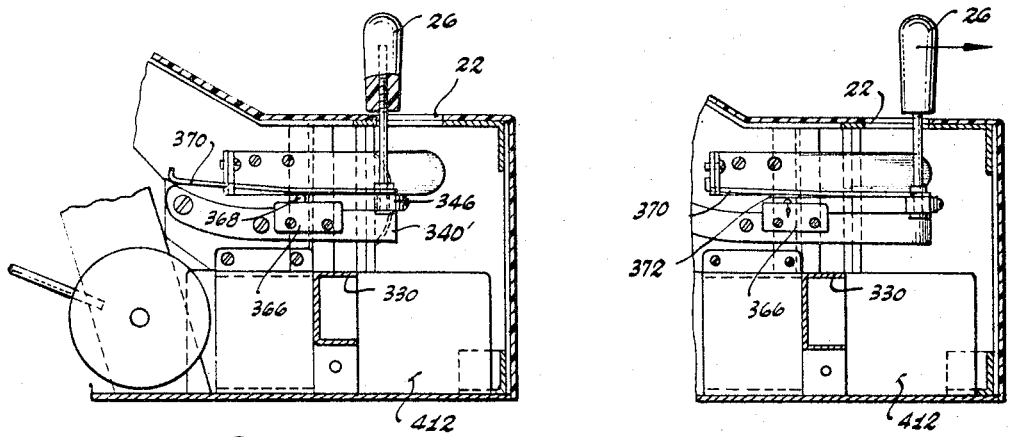

INVENTOR.
WALTER W. BARNEY
BY Fulwider, Patton, Rieber,
Lee, and Utecht
ATTORNEYS INVENTOR.
WALTER W. BARNEY
BY Fulwider, Patton, Rieber
Lee, and Utecht
ATTORNEYS

3,430,200
VALIDATOR APPARATUS FOR MAGNETIC CREDIT CARDS AND THE LIKE

Walter W. Barney, 4720 Rubio Ave., Encino, Calif. 91316
Filed June 30, 1967, Ser. No. 650,483
U.S. Cl. 340—149
Int. Cl. H04q 9/00
23 Claims

ABSTRACT OF THE DISCLOSURE

Embedded in a card are four rows of axially poled magnets. A reader plate carries similarly arranged magnet-operable switches. Corresponding card and movable magnets are poled per a pattern, with selected card magnets coded to deviate from the pattern and operate corresponding movable magnets. Similarly arranged pushbutton-operable switches are connected to the magnet switches, with some connections unrelated to positions of switches connected thereby. Mechanical means provide for operating one push-button-operable switch in each row in predetermined sequence. Circuit means establish visible indications as to validity, and facilitate operation of print-out means when validity is established.

BACKGROUND OF THE INVENTION

Field of the invention

This invention relates to magnetic identification or credit cards, and reader and validator apparatus therefor.

Description of the prior art

In the past, considerable time, effort and expense were devoted to development of magnetic card systems. Such developments included cards with magnet strips embedded therein, and validators with magnet-operable switches to be aligned with and actuated by the embedded magnets. In such systems, the switches are connected in a circuit that provides a visual indication as to validity (or operation of electromechanical apparatus) when there is proper alignment of card magnets and switch magnets.

Several serious drawbacks of such card systems have prevented their acceptance for credit card use. The orientations and polarities of the card magnets can readily be detected, and the cards can be readily duplicated. Also, lost or stolen cards can be used to procure goods and services as readily as with conventional credit cards.

A further disadvantage of previously known magnetic card systems is that they are severely restricted in the number of different codes they can use. Since the magnets are elongated strips lying in a common plane, and are poled longitudinally, the problem of interaction between adjacent magnets necessitates such spacing and positioning thereof that the number which can be placed in a card of conventional size is undesirably small. The number of different polarity patterns (codes) which can be established in such cards is liimted to a few thousand at best. Accordingly, such a card system is not practical for a single design of credit card that is to be furnished to hundreds of thousands or millions of persons.

Magnetic card systems have found use for security purposes, e.g., to gain admittance to and exit from a protected area at a manufacturing plant. However, the fact that such cards can be "decoded" by a finder or thief has made it necessary to change the card code frequently, as by erasing the existing code and providing a new code each time the card is used. Typically, this is done by magnetizing the card magnets in a new code pattern. This also requires that validator circuitry be reset so the validator can detect the new code and perform a function that indicates the card is valid, e.g., by lighting a green lamp and/or releasing a turnstile to permit the card-holder to pass. As is apparent, such elaborate precautions belie the inherent unreliability of the security card system.

SUMMARY OF THE INVENTION

My card system permits use of a card with many closely spaced magnets which can be coded in a number of ways not possible with prior cards, and which cannot readily be duplicated. Validator means includes magnet switches and manually operable switches so connected and operable as to substantially obviate the need to change magnet codes or validator operation in the event a card is lost or stolen.

BRIEF DESCRIPTION OF DRAWINGS

FIGURE 3 is a flow diagram illustrating the steps of my process for forming a card of my invention;

FIGURE 4 is a fragmentary sectional view taken along the lines 4—4 of the first punch station shown in FIGURE 3;

FIGURE 5 is a fragmentary sectional view taken along the lines 5—5 at the second punch station shown in FIGURE 3;

FIGURE 6 is an enlarged, fragmentary sectional view of my card as formed by the process illustrated in FIGURE 3;

FIGURE 7 is a perspective view of a magnet-carrying plate;

FIGURE 8 is an enlarged longitudinal sectional view of an evacuated bulb supporting a conductive magnet for movement into and out of engagement with fixed contacts;

FIGURE 9 is a top plan view of the plate of FIGURE 7 with magnets supported therein, illustrating a pattern of orientation of the magnets;

FIGURE 10 is a fragmentary sectional view of the plate of FIGURE 9 showing the magnets of FIGURE 8 in place and a credit card disposed adjacent to the plate;

FIGURE 11 is a longitudinal sectional view of an evacuated bulb illustrating a conventional magnet carrying a conductive contact which is adapted to move into and out of engagement with fixed conctacts;

FIGURE 12 is a perspective view of another form of magnet-carrying plate;

FIGURE 13 is a fragmentary perspective view of a plate carrying a plurality of fixed contacts to be aligned with the openings in the plate of FIGURE 12;

FIGURE 14 is an enlarged sectional view of the plates of FIGURES 12 and 13 assembled;

FIGURES 15 and 16 are fragmentary sectional views of modified forms of magnet-carrying plates in accordance with my invention;

FIGURE 17 is a longitudinal sectional view of the apparatus shown in FIGURE 1, showing the cooperative arrangement of parts to effect sequential operation of switches in respective switch decades upon sequential operations of the push buttons;

FIGURE 18 is a perspective view of the block of modules of the switch decades of FIGURE 17;

FIGURE 19 is a sectional view of one of the modules of the block of FIGURE 18, showing the arrangements of the parts of a single switch;

FIGURE 20 is a sectional view of a pair of modules of the block of FIGURE 18, showing the poles of switches in the two modules in different positions;

FIGURE 21 is a fragmentary plan view of the bottom of the block of FIGURE 18, showing the arrangements of fixed contacts with which the poles of respective switches are always conductively connected, and to which respective leads are connected;

FIGURE 22 is an enlarged, fragmentary sectional view of the lower portion of one of the modules of the block of FIGURE 18, showing how each fixed contact on the bottom of the block extends into the opening in which the pole is slidable, and with which the pole is in frictional, conductive engagement in either of its positions;

FIGURES 23 and 24 are fragmentary portions of the parts of FIGURE 17 which show the successive operations of individual switches in successive decades upon successive pushbutton operations;

FIGURE 25 is a fragmentary sectional view of the detent operating blade of FIGURE 17 which forms a part of the cooperative mechanisms for effecting the desired sequential switching operations;

FIGURE 26 is a sectional view of the reader block portion of FIGURE 17 with a credit card in place, and showing the movable block and spring biasing means for pressing the credit card against the plate that supports the movable magnets;

FIGURE 27 is a sectional view of the validator apparatus taken along the lines 27—27 of FIGURE 17;

FIGURE 28 is a fragmentary sectional view taken along the lines 28—28 of FIGURE 27, showing the validating check lever in position prior to its operation for validating a credit card;

FIGURE 29 is a fragmentary sectional view similar to FIGURE 28, wherein the validating check lever has been moved to a position to obtain an indication whether the credit card is valid;

DESCRIPTION OF PREFERRED EMBODIMENTS

Figure 1:
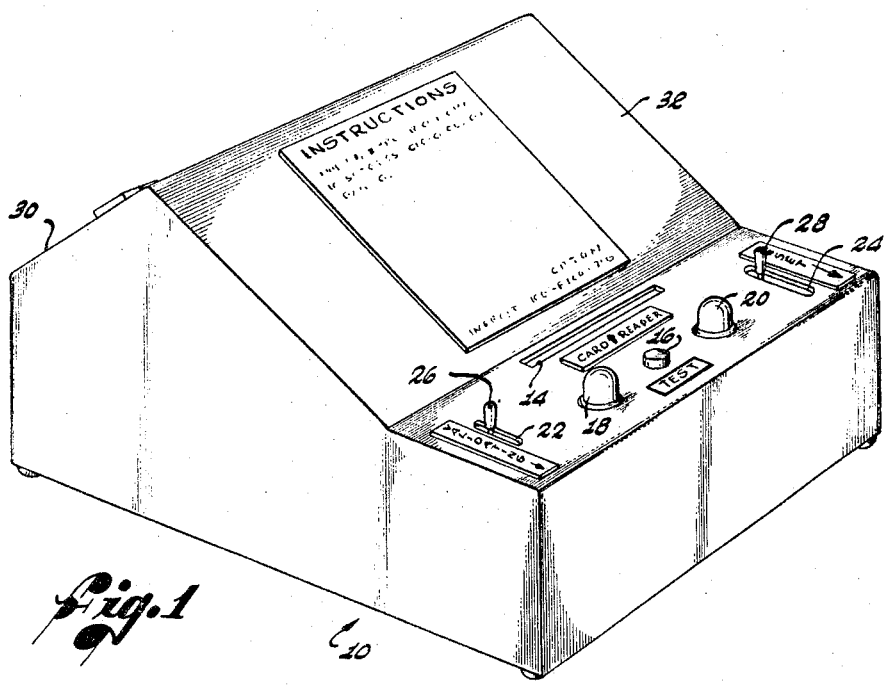
FIGURE 1 is a perspective view of a validator apparatus of my invention.
Figure 2:
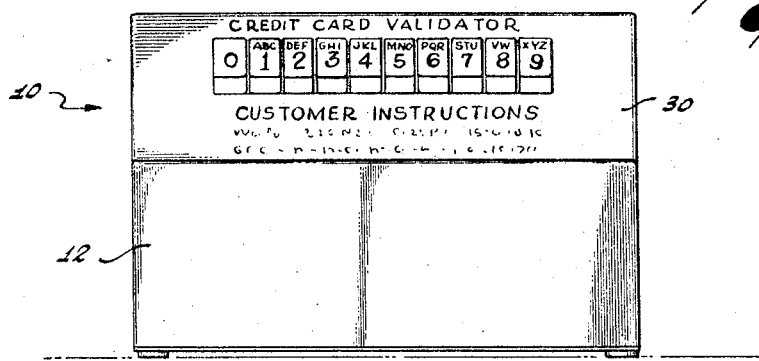
FIGURE 2 is an end elevation view of the apparatus of FIGURE 1, showing the arrangement of pushbuttons to be operated by the owner of a credit card.

Referring to FIGURES 1 and 2, a validator 10 in accordance with my invention includes a housing 12 which at one end has a slot 14 to receive my magnetic card. At the other end of the housing is a row of pushbuttons numbered 0, 1, 2 . . . 9. Near the slot 14 is a test button 16 for connecting a green lamp 18 and a red lamp 20 to a power source to determine their operability.

Also located near the ends of the slot 14 are slots 22, 24 through which the upper ends of respective validation check and reset levers 26, 28 extend. As shown, the upper ends of these levers are provided with knobs to permit them to be readily manipulated by hand.

The validator shown is adapted to set on a counter top, with the portions including the slot 14 and adjacent parts located nearest the person behind the counter, e.g., a sales clerk. Thus, the pushbuttons 0, 1, 2 . . . 9 are facing the customer, i.e., the credit card holder. The customer gives his card to the clerk, who inserts it in the slot 14, presses the test button 16 to be sure the lamps 18, 20 are operative, pulls the lever 28 to set the mechanism within the housing 12, and tells the customer to operate the pushbuttons in accordance with the customer's code. The card has a specific pushbutton code, which is simple enough for a customer to remember. Assume, for example, that the code is a four-digit number 0989. The customer depresses the buttons "0," "9," "8" and "9" in that order. The clerk then actuates the validation check lever 26, by moving it along the slot 22, which causes the green lamp 18 to glow.

If the customer does not depress the right pushbuttons in the proper sequence, the red lamp 20 glows upon actuating the validation check lever 26. If this happens, the operator is thereby informed that the card in the slot 14 may not belong to that customer. In such case, the clerk is on notice that goods or services to be procured with the credit card should not be sold to that customer, and that he should report the matter to his superior.

Preferably, and as shown in FIGURES 1 and 2, the housing 12 is shaped so that the person behind the counter cannot view the pushbuttons, and hence cannot observe the numbers or sequence of the pushbuttons which the customer operates. One way to secure this advantage is shown in which the pushbuttons are mounted in a panel 30 which is hidden from view of the person behind the counter. In this instance, the panel 30 is an inclined face of the housing 12 that faces the customer, and the upper edge of such panel forms an angle with another inclined face 32 that faces the person behind the counter.

While only ten pushbuttons are provided for operation by the customer as above described, my invention makes possible the validation and clearance of cards having millions of different codes. Further, my invention makes it substantially impossible for one who finds or steals a credit card to decode the card and operate the validator so as to make it appear that he is the owner of the card.

To obtain such marked advantages, my invention embraces an opaque laminated card of three layers of flexible, nonmagnetic (e.g., plastic) material, wherein the center ply is formed with a plurality of rows of closely spaced holes, and wherein respective permanent magnets are located in the holes. Referring to FIGURE 3, the plastic sheet 40 that forms the center ply of the card is inserted in a punch, as between a base plate 42 and a plate 44 which supports the plurality of rows of ten punches 46 each. A movable press plate 48 is operated to actuate the punches 46 and thereby punch corresponding rows of openings through the sheet 40. The punches are of small diameter and close spacing to effect correspondingly small, closely spaced openings, e.g., openings of 0.125" diameter, with their centers 0.25" apart, and with 0.25" spacing between the center of adjacent rows.

As shown in FIGURE 4, the base plate 42 has openings 50 disposed below plungers 52 which are supported in housings 54 supported in the upper plate 44, and which are biased upwardly, as by spring biasing indicated at 56.

After the plungers 52 are actuated to punch out the circular openings in the sheet 40, the sheet 40 is moved to a second punch station in which magnetic elements are formed and inserted in such openings. To this end, the second punch station is shown to include a plate 62 that supports a plurality of rows of punches 64, in the manner of the plate 44 and punches 46 previously described. This punch station also includes a base plate 66, but the base plate in this instance is a solid plate. In addition, the second punch station includes a center plate 68 that has a plurality of circular openings 70 (see FIGURE 5) aligned with the plungers 72 of the punches 64.

The punched sheet 40 is sandwiched between the base plate 66 and the center plate 68, with the pre-punched openings in the sheet 40 aligned with the openings 70 of the center plate. Also, a sheet 74 from which the magnets are to be formed is sandwiched between the upper plate 62 and the middle plate 68. Then the ram is actuated, causing the plate 76 to actuate the plungers 72 of the punches simultaneously, whereupon (see FIGURE 5) such plungers in a single movement punch discs 80 from the sheet 74 and carry them through the plate 68 and into the openings in the sheet 40.

I have found that an ideal material for the magnetic sheet 74 is one of magnetic material, such as barium ferrite, in a rubber or plastic base. In cards of my invention, I am able to form magnets of such magnetic rubber of only 0.015″ thickness and 0.125″ diameter. Further in this connection, the sheets 40, 74 are of the same thickness, so that the surfaces of the discs 80 are flush with those of the sheet 40.

The elements 80 are magnetized coaxially, i.e., so the opposite faces of each are of opposite polarities. Further, the elements 80 are initially magnetized in a predetermined master pattern, and coding is thereafter effected by reversing the polarities of selected ones of the elements. The mastern pattern preferably is one in which certain magnets are poled in one direction and the rest are poled in the opposite direction. As will be seen, the pattern may be symmetrical or random. As will also be seen, the card code is different from the associated pushbutton code, i.e., the card owner knows his pushbutton code, but not the code of his card.

The type of material above described for the elements 80 has the characteristic that, once magnetized, the elements are permanent magnets which can be demagnetized, if at all, only with extreme difficulty. However, the polarities of such permanent magnets can readily be reversed. In this connection, each element may be initially magnetized by an electromagnet formed of a C-shaped core that is encircled by a coil (not shown). A strong pulse of current passed through the coil will magnetize the element. After all the elements 80 are thus magnetized, coding is similarly effected, e.g., by placing selected magnets between the ends of the core and passing current in the opposite direction through the coil.

The elements 80 can be magnetized immediately after they are inserted in the sheet 40 as above described. In such case, the surfaces of the sheet 40 and elements 80 are cleaned to remove any dust or other foreign matter. Then a sandwich is formed of the sheet 40 and a pair of outer layers of thin, opaque plastic sheets 82, 84 (see FIGURE 3). This sandwich is placed in a press 86 and subjected to a suitable combination of heat and pressure to fuse the sheets and form a monolithic card blank 88 in which the elements 80 are embedded (see FIGURES 3 and 6). The outer sheets 82, 84 (FIGURE 3) preferably are thinner than the sheet 40, e.g., 0.010″ thick.

The card blank 88 may then be processed to add visible information, e.g., by embossing it with a customer's name and account number. In this latter connection, it is preferred to emboss the card 88 on a portion thereof that does not overlie the magnetic inserts 80. Thus, as illustrated in FIGURE 3, the card is provided with a sufficient surface portion, adjacent the rows of elements 80, on which the desired information can be embossed.

While I have described the magnetizing of the discs 80 before the sheet 40 is sandiched between the sheets 82, 84, the magnetizing of the discs may be done after the card blank 88 is completed. As will be appreciated, since the card blank is opaque, the disc 80 are not visible. However, initial magnetization and coding may be carried out with the indexing and coding apparatus and techniques of my copending application entitled "Encoder Apparatus for Magnetic Credit Cards and the Like," Serial No. 676,138, filed October 18, 1967.

By forming a card with such closely spaced magnets, I provide a substantially tamper-proof device. In this connection, assume that such a card is lost, and the finder attempts to change the code, i.e., so that the code conforms to that of his own or another's card. To carry out such a scheme, it is of course necessary to reverse polarities of a number of the magnets. But to do this requires that the exact center of each magnet be located, and that the requisite field be concentrated only through the individual magnet. Slight misalignment in this operation results in polarity reversals of one or more magnets in addition to that intended. Since the magnets are so small and closely spaced, and cannot be seen, there is little likelihood that one can accurately locate the centers and reverse the polarities of only those magnets that must be changed. As will be seen, such cards will be detected as invalid in my system.

Referring to FIGURE 1, when the card is dropped into the slot 14, selected ones of the permanent magnets in the card are adapted to effect switching operations which, together with switching operations effected by operating the proper ones of the pushbuttons 0, 1, 2 . . . 9, establish a conductive path from a power source. Such conductive path includes the green lamp 18 and switching means operable by the lever 26. Accordingly, actuating the lever 26 places the green lamp 18 in a direct conductive path between the power source and ground potential, whereupon the lamp 18 is illuminated.

Switching operations by magnets in the card are effected by movement of movable magnets adjacent which the coded magnets in the card are located. In this connection, and referring to FIGURES 7–10 along with FIGURE 1, a card placed in the slot 14 comes to rest in face-to-face engagement with a plate 90 that has openings 92 arranged in four rows 94, 96, 98, 100 of ten openings each. Fastened in each of the openings 92 is an evacuated bulb 102 which houses a movable permanent magnet 104 adjacent one end, and a pair of opposed, fixed contacts 106, 108 which extend through the other end. As shown, leads 110, 112 are connected to the external end of the contacts 106, 108. Near the end adjacent the magnet 104, the bulb is encircled by a soft iron ring 114. As shown, the inner end of the magnet 104 is pointed and adapted to enter between and engage the confronting surfaces of the fixed contacts 106, 108. The magnets 104 are made conductive, so that the engagement of such a magnet with its associated fixed contacts 106, 108 establishes a direct connection between such contacts.

FIGURE 9 illustrates a plan view of the face of the plate 90 to which the flat ends of the magnets 104 extend. In FIGURE 9, these ends of the magnets are shown with the polarities corresponding to a master pattern of the type previously mentioned. In the particular pattern here illustrated, the magnets 104 are so poled that the outer ends of the middle two magnets in row 94 are of the same polarity (south), and the polarities of the magnets extending toward the outer ends of that row are alternating north and south poles. The same arrangement is followed in row 98. Rows 96 and 100 are similarly arranged, but with the polarities of the magnets being opposite to those of the corresponding ones in the rows 94 and 98.

When the card 88 is dropped into the slot 14, the disc magnets 80 embedded in the card 88 are aligned with the magnets 104 in the plate 90 (see FIGURE 10). In one arrangement, proper placement of the card in the slot results in all but the four reversed polarity magnets exerting a force of attraction on the magnets 104. As illustrated at the bottom of FIGURE 10, each of the four reversed polarity magnets 80 repels the associated movable magnet 104 and causes it to establish a conductive connection between the associated fixed contacts 106, 108.

When the card 88 is removed from alongside the plate 90, i.e., when it is removed from the slot 14 in FIGURE 1, the magnets 104 which had moved into conductive contact with fixed contacts 106, 108 are automatically disengaged from such fixed contacts and returned to the normal position shown in FIGURE 8. This is accomplished by the adjacent soft iron ring 114. With the force of repulsion removed by withdrawing the card from the slot, all of the magnets 104 are urged, via magnetic attraction to the soft iron rings 114, to the adjacent ends of their bulbs 102.

The bulb 102 may be made of glass or plastic. Also, the magnet 104 may be made nonconductive, but adapted to carry the conductive contact element. For example, and referring to FIGURE 11, there is shown a magnet 120 which has one end of a contact 122 secured to its inner end, e.g., as by suitable cement indicated at 124. The other end of the contact 122 is shaped to enter between and make contact with the inner ends of the contacts 106, 108.

While the magnetically controlled switches above described are arranged to function as normally open switches, it will be apparent that my invention embraces the alternative arrangement, in which the various switches are normally closed. In such case, the coded magnets in the card attract the corresponding movable magnets, thereby to open those switches. All the remaining switches remain closed as a result of repulsion by the magnets in the card. Still further, my invention will be seen to embrace the arrangements of switches wherein normally open switches are closed, or normally closed switches are opened, by either repulsion or attraction.

Again referring to FIGURE 10, the leads 110, 112 extend through the ends of the openings 92 opposite the face of the plate 90 against which the card 88 is to be located. The leads 110, 112 are shown extending through openings in a block 128 of insulation material, e.g., plastic, which is suitably secured, as by adhesive, to the adjacent surface of the plate 90. As shown, one of the leads 112 of each pair is connected to a point of reference or ground potential. The remaining leads 110 are available for connection to additional switching apparatus in my validator, as will hereinafter be described.

My invention also includes other forms of magnet switching devices wherein movable magnets are actuated from magnets in the card of my invention. Referring to FIGURES 12–14, one of such embodiments includes a plate 130 having openings 132 arranged in four rows of ten. In one face of the plate 130, I mill grooves 134 around each opening 132, and deposit in each groove a ring 136 of magnetic material, e.g., soft iron. The wall of each opening 132 is plated, as with gold or silver (indicated at 138 in FIGURE 14). Inserted in each opening 132 is a magnet 140, such magnet also being coated along its length and on the end opposite the grooves 134. The magnets are slidable in their openings.

After the magnets 140 are located in the openings 132, the face of the plate 130 in which the grooves 134 are located is covered with a sheet 142 of nonmagnetic material, e.g., a thin sheet of brass or aluminum, or plastic. Also, the opposite face of the plate 130 is covered with a sheet 144 of nonconductive material, e.g., plastic, which has openings 146 aligned with the openings 132 in which the magnets 140 are located. The openings 146 are substantially larger in diameter than the plated magnets 140. Thus, the plated ends of the magnets 140 can readily move through the openings 146, as when such a magnet is repelled by a magnet in the card 88 when the card is placed alongside the face sheet 142.

In FIGURE 14, the top two magnets 140, the bottom magnet 140, and the corresponding magnets in the card 88 are so poled that the magnets 140 are attracted by the magnets 80, and hence are retained against the sheet 142. However, the third magnet 80 in the card 88 has had its polarity reversed (as previously described for initially magnetizing all the magnets 80 in the predetermined pattern, and then coding the card by reversing the polarities of selected ones of the magnets 80). Accordingly, the third magnet 140 in FIGURE 14 is repelled, so that the plated end thereof moves past the adjacent face of the plate 130 and through the adjacent opening 146 in the plastic sheet 144.

A magnet 140 that is subjected to such movement is brought into engagement with an electrical contact. In this connection, and referring to FIGURE 13 along with FIGURE 14, a block 150 is provided in which a plurality of contacts 152 are embedded. As best seen in FIGURE 14, each of the contacts 152 is formed as a short rod-like element that extends through the block 150, and which has an enlarged head that is substantially larger in diameter than the openings 140 in the plastic sheet 144. The block 150 is fastened at 156 to the plate 130, so that the end faces of the heads of the contacts 152 are brought firmly into abutment with the adjacent face of the sheet 144. Thus, when a movable magnet 140 is repelled by a magnet 80 in the card 88, the plated end of the magnet comes into contact with the adjacent surface of the head of the contact 152. To enhance conductive contact, the enlarged heads of the contacts 152 may be similarly plated.

As will be observed, the magnets 140 are housed in a contaminant-free environment. The sheet 142 on the one face of the plate 130 covers the openings 132 in that surface. At the opposite ends of the magnets 140, the outer ends of the openings 146 are closed by the enlarged heads of the contacts 152.

It will be apparent in FIGURE 14 that the magnets are in conductive contact with the plate 130. Also, any magnet 140 that is moved into engagement with a fixed contact 152 establishes a conductive connection between the contact 152 and the plate 130. The plate 130 is shown connected to a point of reference or ground potential, and leads 110 are conductively secured to the outer ends of the contacts 152, and are adapted for connection to additional switching circuits as in the manner previously indicated for the leads 110 of FIGURE 10.

The soft iron rings 136 in FIGURE 14 serve the same purpose as the bands 114 of magnetic material in FIGURES 8 and 10, i.e., when the card 88 is withdrawn from adjacent the plate 130, the extended magnet 140 is retracted into the plate 130 due to the attractive force between the iron ring 136 and the adjacent end of such magnet.

FIGURE 15 illustrates a modified form of the arrangement shown in FIGURE 14. In this case, the non-magnetic plate 130 is replaced with a plate 160 of magnetic material. Instead of the small openings 132 and grooves 134 of the plate 130, the plate 162 is provided with relatively large openings 164, and cylindrical inserts 166, e.g., brass or aluminum, are press-fit into the openings 164. The inner walls of the inserts 166 are plated at 168, and the plated magnets 140 are slidably mounted in the plated inserts 164. As indicated, this arrangement is one in which each magnet 140 is provided with a completed magnetic path through the material of the plate 162. In such arrangement, when such a magnet is repelled by a magnet in a credit card, so as to make contact with the fixed contact 152, withdrawal of the card results in the magnet 140 automatically being retracted to its normal position within the plate 162.

FIGURE 16 illustrates a further modification wherein a plate 130′ for housing magnets 140 is made of nonmagnetic material, like the plate 130 of FIGURE 14. Nonmagnetic inserts 166′ are provided which are like the inserts 166 of FIGURE 15. The inserts 166′ are press-fit into inserts 170 of magnetic material, and these in turn are press-fit into openings 172 provided in the plate 130′. As will be seen, the magnetic inserts 170, like the plate 162 of FIGURE 15, provide a magnetic path for each of the magnets 140, to aid in retracting the magnets following their movement into engagement with the fixed contact 152. The plastic sheet 174 covering the outer face of the plate 130′ serves the same purpose as the nonmagnetic plate 142 of FIGURES 14 and 15.

As previously indicated, the leads 110 of FIGURES 10 and 14 are connected to other switches. Thus, in order for a validator of my invention to "clear" a particular card, additional switches must be operated to provide a desired circuit condition. Referring to FIGURES 17–26 along with FIGURES 1 and 2, such additional switching is effected through operation of the pushbuttons 0, 1, 2 . . . 9. In the arrangement shown, there is provided a block 180 of four modules 182, each of which supports a row of ten conductive rods 184 that form the movable poles of respective single-pole, double-throw switches.

In this latter connection, each of the modules 182 is formed of a rectilinear block of insulation material having a row of ten spaced, parallel openings in which the rods 182 are mounted. The rods 184 are threaded at their opposite ends, and headed screws 188, 190 are threaded into the upper and lower ends of the rods 184.

As best seen with reference to FIGURES 18 and 19, each block 182 has a flat, longitudinal groove 192 extending end to end, from which ten spaced lateral grooves 194 extend upwardly and terminate in lateral openings 196 which communicate with the openings 186 in which the rods 184 are located. Located in the flat groove 192 is a bus bar 200, which has ten integral leaf springs 202 that lay in the grooves 194. The end of each leaf spring 202 is bent inwardly in the associated opening 196 so as to lie in the path of the associated rod 184. Each bus 200 is staked to its block 182, as indicated at 204 in FIGURE 18.

Each block 182 has a similar bus bar 208 staked to its opposite surface, such bus 208 also having leaf springs 210 bent inwardly at their upper ends to extend through openings 212 and into the paths of the rods 184.

As shown, the openings 196, 212 are displaced. With this arrangement, the rods 184 are shaped so that when they are in their upper positions, i.e., with the flat heads of the screws 190 abutting the lower surfaces of the modules 182, the ends of the leaf springs 202 confront reduced diameter portions 216 of the rods 184 and hence do not contact the rods. However, in such upper positions of the rods 184, the upper ends of the leaf springs 210 engage the lateral surfaces of the rods. Contrariwise, when the rods 184 are forced downwardly so that the flat heads of the screw 188 engage the upper surfaces of the modules 182, the reduced diameter portions 216 of the rods confront the upper ends of the leaf springs 210 and hence are not engaged thereby, whereas the upper ends of the leaf springs 202 engage the rods 184.

Such contact arrangements in the different positions of the rods 184 are best seen by inspection of FIGURE 20. As will be observed, the ends of the leaf springs 202, 210 and the ends of the reduced diameter portions 216 of the rods 184 are shaped so that upon moving the rods as above described, from positions wherein the reduced diameter portions 216 confront the ends of the leaf springs, the shoulders at the ends of the reduced diameter portions 216 smoothly cam the ends of the leaf springs outwardly to permit them to ride on the lateral surfaces of the rods.

As will also be apparent, by nesting the bus bars 200, 208 and their leaf springs in grooves as above described, the modules 182 can be stacked side by side with their confronting faces in surface-to-surface contact. In this connection, the grooves in which the bus bars and their leaf springs are located are preferably sufficiently deep to avoid metal-to-metal contact between portions of bus bars and leaf springs in the abutting surfaces of adjacent modules 182. As indicated in FIGURE 18, the modules 182 are provided with openings 218 adjacent their ends, which openings are aligned when the modules are placed side by side for receiving pins on which the modules can be fastened to form the block 180.

Referring to FIGURES 18, 21 and 22, the shanks of the rods 184 are always in contact with respect to fixed contacts 220 which are secured to the lower surfaces of the modules 182. As shown, the contacts 220 are flat elements which lay on and are attached to the lower surfaces of the modules. At their inner ends, the contacts 220 are bent and extend into the openings 186, where they are frictionally engaged by the rods 184. In the examples shown, the portions of the rods which ride on the inwardly extending ends of the contacts 220 are provided with flat surfaces. Preferably, the inwardly extending ends of the contacts 220 are shaped to be self-biasing against the rods 184 with sufficient force to frictionally hold the rods in either their uppermost or lowermost positions.

The outer ends of the contacts 220 terminate adjacent the surface of the module. In the arrangement shown, the ends of the contacts 220 are bent so as to lay parallel to such surface, and such parallel portions provide surfaces to which are soldered the ends of the leads 110 (of FIGURES 10 and 14).

Referring to FIGURES 17 and 18, the block 180 is secured to a frame 226, as on pins 228 that extend through the openings 218 and which are secured to the frame at 230, 231. As shown, the block 180 is mounted so that its upper surface is in a plane that is at right angles to the plane of the axes of the pushbuttons 0, 1, 2 . . . 9. Thus, the axes of the rods 184 and of the pushbuttons are parallel.

In their normal positions, the rods 184 are in their uppermost positions (as in FIGURE 17). In such position, all of the leaf springs 210 (FIGURES 18-20) are conductively connected through the rods 184 to the contacts 220. With the rods 184 thus positioned, I provide mechanism whereby, upon four successive pushbuttons being depressed, one rod 184 in each module is forced to its lowermost position, thereby selectively disconnecting the associated leaf springs 210 from, and connecting the associated leaf springs 202 to, the fixed contacts 220.

As best seen in FIGURES 17, 23–25 and 27, such mechanism includes a flat bar 240 above the block 180, and which is slidably mounted, as on pins 242, so that it can be successively stepped to positions above each row of rods 184. Supported in the bar 240 are ten plunger elements 244 which, when the bar 240 is positioned over a row of rods 184, are aligned with respective ones of the rods. The plunger elements 244 are spring biased upwardly at 246 (FIG. 17) so that their lower ends are spaced slightly above the upper ends of the rods 184. At their upper ends, the plunger elements 244 abut respective flat bars 248 which are secured to the lower ends of pins 250. The pushbuttons 0, 1, 2 . . . 9 are attached to the upper ends of the pins 250.

As shown, the pins 250 are slidably mounted in sleeves 252 which are secured at their lower ends to the frame 226. By means of springs 254 extending from the frame and into the pushbuttons, the pushbuttons, and hence the pins 250 and bars 248, are biased upwardly. The spring rates of the springs 246, 254 are such that the pushbuttons are normally extended, and the bars 248 are normally biased against the adjacent portions of the frame 226.

As illustrated, the bars 248 are of sufficient length to span four corresponding rods 184 in the block 180. Accordingly, whenever the bar 240 is positioned over the row of rods 184 in one module 182, pressing one pushbutton results in downward movement of its associated bar 248, whereby the associated plunger element 244 (see FIGURES 23 and 24) is forced downwardly, thereby engaging the upper end of the adjacent rod 184 and forcing it to its lowermost position.

As previously mentioned, the bar 240 is adapted to be stepped along the modules 182. For this purpose, and preparatory to operating any of the pushbuttons 0, 1, 2, 1 . . . 9, the lever 28 (FIGURES 1 and 17) is operated by the clerk to move the bar 240 to a position where its plunger elements 244 are located over the rods 184 of an outer module 182. Where the block 180 is tilted, as in FIGURE 17, operation of the lever 28 moves the bar 240 to a position over the uppermost module 182. From such position, pressing a pushbutton 0, 1, 2 . . . 9 causes a corresponding rod 184 in the upper module 182 to be forced to its lowermost position. Then the bar 240 steps to a position over the rods 184 of the adjacent module 182 (FIG. 24); one of the rods in this second module is similarly depressed, and operation of such second pushbutton causes the bar 240 to step to the third module; a third pushbutton operation forces a rod in the third module downwardly, and causes the bar 240 to step to the last module 182, whereupon a fourth pushbutton operation causes one of the rods in that module to be moved to its lowermost position.

In the validator mechanism shown, cooperative mechanisms are provided wherein movement of the lever 28 carries the bar 240 upwards to a position over the upper module 182, where it is latched until the first pushbutton operation occurs, following which the bar is biased to move downwardly and is releasably held in each of its successive positions. Referring to FIGURES 17 and 27 a shaft 260 extending below the block 180 has discs 262, 264, secured at its ends, and elongated pins 266, 268 are staked at one end in the discs 262, 264.

The shaft 260 is adapted for rotational movement by the lever 28, and to this end the lever is shown to be formed as one end of a pull rod 270. The pull rod 270 is secured at its other end to one end of a link member 272. The link 272 is pivotally mounted at its opposite end to a plate 274 that is secured to the shaft 260. With the parts arranged as shown, movement of the lever 28 through the slot 24 causes the plate 274 to rotate upwardly and toward the operator. Accordingly, the pins 266, 268 secured in the discs 262, 264 are carried upwardly.

The pins 266, 268 carry the plate 240 to the position where its plunger elements 244 are disposed over the rods 184 in the uppermost module 182. For this purpose, the bar 240 (see FIG. 27) is provided with pins 282, 284 which are secured in its ends, and such pins are in the paths of the pins 266, 268. The pins 266, 268 are of sufficient length that when they are rotated upwardly as previously described, they engage the pins 282, 284, so the bar 240 is forced upwardly on its guide rods 242.

As previously mentioned, the bar 240 is latched in its upper position, i.e., the position in which its plunger elements 244 are aligned with the rods 184 in the uppermost module of the block 180. For thus latching the bar 240, and also for latching it in its successive positions, there is provided a narrow latch or detent plate 290 (FIGURES 17, 23, 24 and 27). The plate 290 is pivoted at 292 with respect to the frame 226, and spans the block 180. As shown, the lower edge of the plate 290 is shaped to provide four spaced teeth 296. As best seen in FIGURES 23 and 24, the bar is provided with a finger 298 that extends above its upper surface, and which is adapted to come into engagement with the teeth 296. The bar 290 is biased downwardly, as by a leaf spring 300 (FIG. 17) that is secured to the arm 302 on which the bar 290 is pivoted, and which continuously engages the upper edge of the bar and urges it downwardly.

From the "reset" position of the bar 240, i.e., where the bar 240 is in its upper position as shown in FIGURE 17, the finger 298 on the bar is successively stepped to the successive teeth 296 by successive operations of the pushbuttons 0, 1, 2 . . . 9. For each such pushbutton operation, the detent 290 is momentarily raised, whereby the tooth 296 engaged by the finger 298 is cleared from the upper end of the finger, and the bar is allowed to move downwardly on its guide rods 242. The action of the spring 300 keeps the detents 290 bearing against the upper end of the finger 298, thereby insuring that it will come into engagement with the next succeeding tooth 296.

Movement of the bar 240 is effected by a spring 304 (FIGURE 27), shown as an elongated, bowed spring which is fixed at one end to the frame at one end of the bar 240, and which has its opposite end bearing against the side of the bar. Whenever the detent 290 is raised, the action of the spring 304 forces the bar 240 along its support rods to cause the finger 298 to be urged against the next succeeding tooth 296.

To effect momentary lifting of the detent 290 for the above-described operation, the detent is shown as an L-shaped member having its upper leg 290' in the path of a blade 306 that is pivotally mounted at 308 adjacent the lower end of the leg 290'. The free edge of the blade 306 normally rests on the upper end of a stop 310 (FIGURES 17 and 25). To facilitate upward movement of the blade 306 by any of the pushbuttons 0, 1, 2 . . . 9, each of the flat bars 248 connected to the pushbuttons carries a respective L-shaped spring 314, one leg of which is secured to the bar 248, and the other leg of which extends below the free edge of the blade 306. As best seen in FIGURE 17, the portion of each spring 314 adjacent the blade 306 has a ledge 314' which is adapted, upon the associated pushbutton being pressed inwardly, to pass below the free edge of the blade 306, and to engage the blade in the return movement thereof, i.e., during release of the associated pushbutton. During such return movement, the spring 314 moves the free edge of the blade 306 upwardly, and this in turn engages the lower end of the leg 290' and carries the detent upwardly. The parts are suitably shaped and dimensioned to ensure the detent 290 will be raised at least the length of one of its teeth 296, whereupon the bar 240 is urged to the next successive position as previously explained.

As previously mentioned, the uppermost positions of the rods 184 are their normal positions. All of the rods are placed in these positions when the bar 240 is moved to the starting position, i.e., over the uppermost module of the block 180 in the example shown. Preferably, resetting the rods 184 is done simultaneously with moving the bar 240 to its reset position. To effect this result with the lever 28, I provide a rack 320 which carries four spaced bars 322 of nonconductive material. The rack 320 is pivotally mounted at 325 below the block 180. The bars 322 span the rods 184 in the corresponding modules, and when the rack 320 is pivoted upwardly (counterclockwise in FIGURE 17), the bars 322 engage any rods 184 that are in their lowermost positions, and force the rods 184 back into their uppermost positions. For this purpose, a cam element 326 is secured to the shaft 260. When the push rod 270 is pulled to reset the bar 240 in its uppermost position, the cam 326 cams the rack 320 upwardly to effect the desired resetting of the rods 184 in the uppermost positions.

As previously indicated, when a card is placed in the slot 14 (FIG. 1), the magnets in the card are aligned with the movable magnets in the adjacent plate. To this end, and referring to FIGURES 17, 26 and 27, a horizontal shelf member 330 abuts the lower edge of such plate (shown as the plate 130 of FIGURE 14), and for this purpose may be secured to the lower edge of the plate 130. The plate 330 extends forwardly of the plate 130, and slidably supports a movable plate 332. A pair of side rails 334 are secured to the plate 130, and a portion of the plate 332 is located between and in slidable engagement with the confronting edges of the side plates 334. As shown in FIGURE 7, the plate 332 has portions extending parallel to the outer faces of the side plates 334, and pins 336 secured to these portions of the plate 332 extend into guide openings in the plates 334. Small springs 338 surrounding the pins 336 bias the movable plate 332 outwardly.

Thus, the slot 14 is defined by the confronting faces of the plates 130, 332, the confronting edges of the side rails 334, and the horizontal shelf member 330. The distance between the confronting surfaces of the side rails 334 is such that the ends of the card slidably engage the rails. When the card comes to rest on the horizontal shelf member 330, its position is properly indexed so that its magnets are aligned with the movable magnets supported in the plate 130. In this connection, the card is dimensioned so that the first row of magnets therein above its bottom edge is the same distance above the shelf member 330 as the corresponding row of movable magnets in the plate 130.

While the springs 338 urge the movable plate 332 outwardly, the outer position of the plate 332 is limited. Further, upon pulling the validation check lever 26, the plate 332 is moved inwardly to clamp the card against the plate 130. As will be appreciated, clamping a card against the plate 130 places the fixed magnets in the card in the closest proximity to the movable magnets in the plate 130.

For the above-described purposes, there is provided a fixed bar 340 which extends along the outer surface of the plate 332. In this example, the bar 340 is an L-shaped element which has one leg 340′ secured to an adjacent portion of the frame 226, and which has its other leg extending around and alongside the outer surface of the plate 332. The bar 340 thus acts as a stop which limits the outer position to which the plate 332 can be moved by the springs 338.

Another bar 346 is pivotally mounted at one end on the bar 340, as indicated at 348. The bar 346 carries a leaf spring 350 which extends past the end of the bar 340 and engages the outer surface of the plate 332. Thus, when the lever 26 is pulled, the bar 346 is pivoted (counterclockwise as viewed in FIGURE 27), thereby to cause the leaf spring 350 to press against the outer surface of the plate 332 and force it inwardly (see FIGURE 26). A credit card inserted in the slot 14 is thereby urged firmly against the plate 130. When the lever 26 is released, the springs 338, 350 cooperate to return the plate 332, the bar 346 and the lever 26 to their normal positions.

My validator system is one in which the incrementally movable bar 240 (FIG. 17) and the validation check lever 26 (FIGURES 1 and 27) are used to operate switches by which one is informed whether or not the card under test is valid. Referring to FIGURES 17 and 27, a normally open switch 360 is provided which has a spring biased plunger 362 and a pivotally mounted lever 364 that is disposed in the path of the bar 240. When the bar 240 moves into the position wherein its finger 298 engages the lowermost detent surface 296 of the detent 290, i.e., when the bar 240 moves into position wherein its plunger elements are aligned with the rods 184 of the lowermost module 182 (following operation of the third pushbutton), the bar depresses the lever 364 and hence the plunger 362, to close the switch 360.

Referring to FIGURES 28 and 29, a normally open switch 366 is secured to the fixed arm 340′, and has an outwardly biased plunger 368 disposed below a bar 370 that is secured at one end to the bar 346 on which the lever 26 is mounted. The bar 370 has a plunger operating portion 372 on its lower surface (FIGURE 29), so that when the lever 26 is pulled, the plunger 368 is depressed and the switch 366 is closed.

Figure 30:
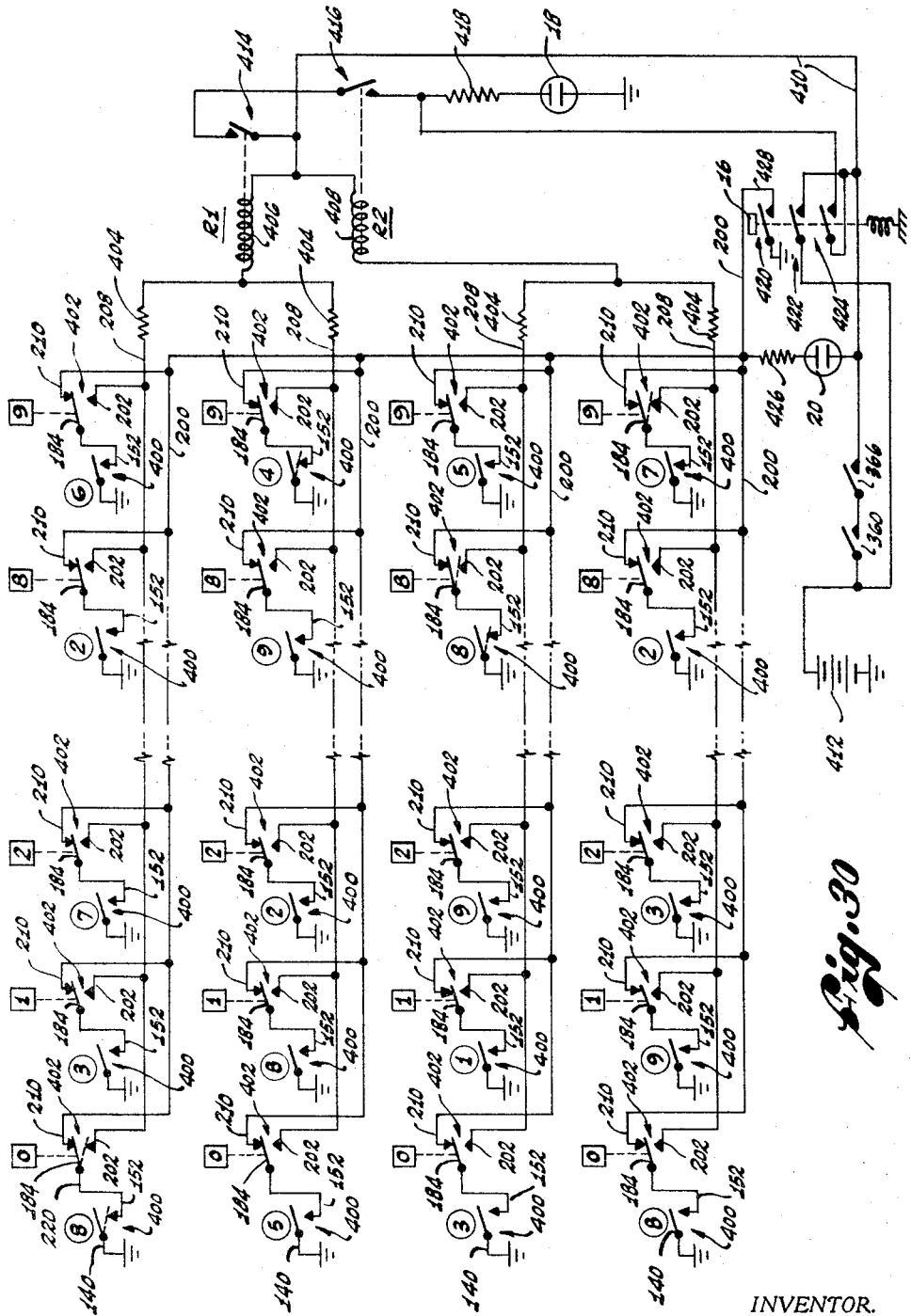
FIGURE 30 is a schematic diagram of a circuit of my invention with which to establish information whether the person operating the pushbutton is the owner of the card.

A circuit of my invention in which the switches 360, 366 are incorporated is illustrated in FIGURE 30. In FIGURE 30, there is shown four rows of switches which correspond to the magnet switches and to the pushbutton-operated switches heretofore described. In each row are ten pairs of switches 400, 402, wherein the switches 400 are normally open, single-pole, single throw switches representing the magnet switches, and the switches 402 are single-pole, double throw switches representing the pushbutton-operated switches. As shown, the fixed contact of each switch 400 is connected to the movable contact of a respective switch 402.

To aid in understanding the circuit of FIGURE 30, the switches 400 are exemplified as schematic representations of the magnet switches of FIGURE 14, wherein the movable contact of each switch 400 represents a respective magnet 140 in the plate 130, and the fixed contact represents the fixed contacts 152 in the plate 150. For each switch 402, the movable contact represents a respective rod 184 in the block 180 (FIGURES 18–22), and the fixed contacts represent the spring contacts 202, 210. In each row, the fixed contacts 210 and the fixed contacts 202 are connected to respective buses representing the bus bars 208, 200 in FIGURES 18–20.

As shown in FIGURE 30, respective resistors 404 are connected to the buses 208. The resistors 404 in the top two rows are connected to one end of the coil 406 of a relay R1, and the resistors 404 in the bottom two rows are connected to one end of the coil 408 of a relay R2. The remaining ends of the coils 406, 408 are connected at 410 to the fixed contact of the switch 366 (previously described in connection with FIGURE 27). The movable contact of the switch 366 is connected to the fixed contact of the switch 360 (previously described in connection with FIGURES 28 and 29), and the movable contact of the switch 360 is connected to the positive terminal of a battery 412.

The relays R1, R2 control normally open switches 414, 416, wherein the movable contact of the switch 414 is connected to the junction of the coils 406, 408, the fixed contact of the switch 414 is connected to the movable contact of the switch 416, and the fixed contact of the switch 416 is connected to a resistor 418. The green lamp 18, shown as a neon tube, is connected between the resistor 418 and ground. Thus, when the relays R1, R2 are energized, and their switches 414, 416 are closed, closure of the switches 360, 366 provides a completed direct current path from the positive terminal of the battery 412 through such switches and through the resistor 418 and the lamp 18 to ground.

Operation of the relays R1, R2 for the above-described purpose is effected by operating the pushbuttons 0, 1, 2 ... 9 so that in successive rows only the switches 402 are actuated which have their corresponding magnet-operated switches 400 closed. In this connection, FIGURE 30 shows pushbuttons 0, 1, 2 ... 9 in each row that are connected to respective movable contacts 184 of the switches 402. While a separate row of pushbuttons 0, 1, 2 ... 9 is shown in FIGURE 30 for each row of switches 402, it will be understood that in the context of the preceding discussion, the "0" pushbuttons in FIGURE 30 represent the single "0" pushbutton in FIGURE 2; the "1" pushbuttons in FIGURE 30 represent the single "1" pushbutton in FIGURE 2; and so on, with the "9" pushbuttons in FIGURE 30 representing the single "9" pushbutton in FIGURE 2.

As previously indicated, the validator of my invention frustrates any attempt to "break" the code in a card. This aim is achieved by connecting one or more of the switches 402 to other than the corresponding magnet switches 400. Thus, for example, in the top row of switches 400 in FIGURE 30, the movable contact 184 of the first switch 402 is connected to the fixed contact of the eighth magnet switch 400 in one row of magnet switches. Proceeding, the movable contacts of the second, third, ninth and tenth switches 402 shown in the top row are connected to the fixed 402 shown in the top row are connected to the fixed contacts of the respective third, seventh, second and sixth switches 400 in such one row of magnet switches.

Similarly, the movable contacts of the first, second, third, ninth and tenth switches 402 in the second row in FIGURE 30 are shown connected to the fixed contacts of the fifth, eighth, second, ninth and fourth switches 400 in a second row of magnet switches. In the third row, the movable contacts of the first, second, third, ninth and tenth switches 402 are connected to the fixed contacts of the third, first, ninth, eighth and fifth switches 40 in a third row of magnet switches. In the bottom row, the movable contacts of the first, second, third, ninth and tenth switches 402 are respectively connected to the fixed contacts of the eighth, ninth, third, second and seventh switches 400 in the remaining row of magnet switches.

To further aid in understanding the significance of such connections, FIGURE 18 illustrates the sequence in which the "0," "9," "8," and "9" pushbuttons have been successively depressed, thereby to move the corresponding first, tenth, ninth, tenth rods 184 in the successive modules 182 to their lowermost positions. Thus, and referring to FIGURE 30, this sequence of operations is one in which the movable contact 184 of the first switch 402 in the top row is switched to its corresponding fixed contact 202; the movable contact of the last switch 402 in the second row is switched to its fixed contact 202; the movable contact of the next-to-last switch 402 in the third row is switched to its fixed contact 202; and the movable contact of the last switch 402 in the bottom row is switched to its fixed contact 202.

For the assumed sequence of operation of the pushbuttons 0, 1, 2 . . . 9, it is required that the card be coded so that in the corresponding rows of magnet switches 400, the eighth, fourth, eighth, and seventh magnet switches in the successive rows be closed.

As will now be appreciated, should one be able to determine which magnets in a card represent the code for that card, he still would not know which four pushbuttons 0, 1, 2 . . . 9 should be depressed, or in what sequence these four pushbuttons should be operated. If he operated the pushbuttons that correspond to the code in the card, he would operate pushbuttons "8," "4," "8" and "7." Since the correct sequence is "0," "9," "8," and "9," operation of the validation check lever as previously described would not result in the green lamp 18 being illuminated. Rather, the red lamp 20 would be illuminated, thereby indicating that the person in possession of the card is not the rightful owner.

The operation of circuit of FIGURE 30 will first be described for the situation wherein the pushbuttons have been operated in the correct sequence. When the first pushbutton "0" is depressed, the corresponding switch 402 is switched to its fixed contact 202. Thus, the adjacent end of the coil 406 and the associated resistor 404 are connected to ground through such "0"-operated switch 402 and the eighth switch of the corresponding row of magnet switches.

Following operation of the "0" pushbutton, the bar 240 (FIG. 17) is stepped to its second position. When the second pushbutton "9" is depressed, its corresponding switch 402 is switched to its fixed contact 202, and the adjacent end of coil 406 and the second resistor 404 are connected to ground through the "9"-operated switch 402 and the fourth switch of the second row of magnet switches.

After the second pushbutton "9" is operated as above described, the bar 240 (FIG. 17) is positioned over the third row of rods 184 in the block 180. Referring to FIGURE 30, pressing pushbutton "8" effects switching of the corresponding switch 402 to its fixed contact 202, and the bar 240 is released for movement into its last position. As previously explained, movement of the bar into this last position causes the switch 360 to be closed.

Such operation of the third pushbutton "8" connects the associated resistor 404 and the adjacent end of the coil 408 of relay R2 to ground through the "8"-operated switch 402 and the eighth switch 400 of the corresponding row of magnet switches.

Finally, operation of the fourth pushbutton "9" similarly connects the remaining resistor 404 and the coil 408 through a parallel path to ground, through the "9"-operated switch 402 and the seventh switch 400 of the corresponding row of magnet switches.

Accordingly, when the validation check lever is pulled to close the switch 366, each relay coil 406, 408 is connected to ground through a parallel resistive network. For each coil, the establishment of these parallel paths to ground is sufficient to energize the coil. Therefore, upon closure of the switch 366, the switches 414, 416 are closed, and the green lamp 18 is illuminated.

The resistors 404 in this example are all of the same value. However, these values are such that, for either relay, insufficient current is drawn through a single resistor 404 to energize the relay. Accordingly, if one of the switch combinations 400, 402 associated with either relay does not provide a path to ground through the associated resistor 404, the relay will not be energized.

Referring to FIGURE 30, the green lamp 18 and the red lamp 20 are simultaneously illuminated upon operating the test button 16. Also, the red lamp 20 is illuminated following operation of successive pushbuttons wherein any pushbutton is incorrectly pressed. For test purposes, the pushbutton 16 is adapted to close three normally open switches 420, 422, 424, the movable contacts of which are ganged for simultaneous operation by the pushbutton 16. The red lamp 20 and a resistor 426 are serially connected between the lead 410 and one of the buses 200. As shown, all of the buses 200 are directly connected together. For the switch 420, its movable contact is connected to ground, and its fixed contact is connected at 428 to the bus side of the resistor 426.

The switch 422 has its movable contact connected to the positive terminal of the battery 412, and its fixed contact is connected both to the lead 410 and to the movable contact of the switch 424. As shown, the fixed contact of the switch 424 is connected to the junction of the resistor 418 and the fixed contact of the relay switch 416.

With the above-described arrangement, pressing the pushbutton 16, to momentarily close the switches 420, 422, 424, simultaneously connects the red and green lamps 18, 20 in parallel across the battery 412.

If any pushbutton 0, 1, 2 . . . 9 is incorrectly depressed—whether it be a pushbutton that is not one of the four that is required to be operated, or a pushbutton of a proper number that is operated out of sequence—the red lamp 20 is illuminated. In this connection, assume that four pushbuttons have been operated, whereby the switch 360 is closed, but that one of the pushbuttons has been operated incorrectly. For example, assume that the pushbuttons have been operated in accordance with the sequence of the code for the magnets in the card, i.e., pushbuttons "8," "4," "8" and "7." Since the correct sequence of "0," "9," "8" and "9," the relays R1, R2 are not energized, and the green lamp 18 is not illuminated when the switch 366 is closed. However, the red lamp 20 is illuminated, and this is effected through several circuits in which the lamp 20 is included. For example, in the bottom row of switches in FIGURE 30, the movable contact 184 of the last switch 402 remains in engagement with its fixed contact 210. Since the associated magnet switch 400 is closed, the path in which the red lamp 20 is located includes the switches 360, 366, the lamp 20 and its resistor 426, the bus 200, and the switches 402, 400 just mentioned. The lamp 20 is thus in a direct path to ground from the positive terminal of the battery 412, and the lamp 20 is illuminated.

The same situation exists for the top two rows of switches. Since the "0" pushbutton was not first operated in the sequence, the associated movable contact 184 of the switch 402 in the top row remains in engagement with its fixed contact 210. And since the associated magnet switch 400 is closed, a D-C path is traceable from the battery through the switches 360, 366, the lamp and its resistor 426, the bus 200 associated with the top row of switches, and the first pair of switches 400, 402 in that row. Further inspection will show that the same kind direct path to ground is established through the last pair of switches 400, 402 in the second row.

In the example assume above, the "8" pushbutton was operated in its proper order in the sequence. This of course resulted in the movable contact 184 of the associated switch 402 being switched to its fixed contact 202, whereby to connect the adjacent end of the relay coil 408 to ground through the associated closed magnet switch 400 and the bus 208. However, and for the reasons previously explained, the value of the associated resistor 404 is such that insufficient current flows through the coil 408 to energize that relay.

The red lamp 20 is illuminated upon closing the switch 366 when the traveling bar 240 (FIGURE 17) has moved into its last position, but wherein the final pushbutton of the sequence has not been operated. In this connection and referring again to FIGURE 30, assume that the "0," "9" and "8" pushbuttons have been depressed. The sequence is thus far correct, and the switch 360 is closed by virtue of the traveling bar moving into its last position. If the switch 366 is closed before the final "9" pushbutton is pressed, a path to ground from the positive terminal of the battery is established through the switches 360, 366, the red lamp 20 and its resistor 426, the adjacent bus 200, and the last pair of associated switches 400, 402 (because the movable contact 184 of the last switch 402 remains in engagement with its fixed contact 210). Because of this possibility, the clerk who operates the switch 366, i.e., the validation check lever 26 which closes the switch 366, should reset the mechanisms and request the customer to operate the pushbuttons again, and to make sure that four of the pushbuttons are pressed in the proper sequence.

In addition to the foregoing, the red lamp 20 is illuminated even though the correct sequence of pushbuttons is operated, if there is any other magnet in the card that is out of the requisite pattern. For example, assume that four magnets in the card are properly coded, but there is also a magnet in the card that closes an additional magnet switch, e.g., the seventh magnet switch in the top row of FIGURE 30. Pressing the pushbuttons "0," "9," "8," "9" causes the green lamp 18 to be illuminated when the validation check lever is operated, all as above described.

However, since the seventh magnet switch 400 in the top row is also closed, and the associated switch 402 remains switched to its fixed contact 210, the red lamp 20 is also connected across the battery 412, and is thus illuminated.

FIGURES 31–34 illustrate a combined validator and print-out apparatus in accordance with my invention. The plate 150' against which the card 88 is placed (and which supports the movable magnets) and the movable plate 332' extend above the surface 450 in which the slots 22', 24' are formed (primes are used for like parts previously described in connection with FIGURES 1 and 27). The plates 150', 332' are approximately the same height as the card 88. The card (FIG. 32) has an embossed portion 452 above the top row of magnets 80 therein, which carries information to be imprinted upon carbonized paper.

Secured to the surface 450 is a flat, hollow housing 456 which is open at one side, and which has a slot 458 in its top surface 460. The open side of the housing covers the upper edge of the movable plate 332'. The plate 130' and the upper surface 460 of the housing 456 have aligned notches 462, 464, whereby to permit one to grasp the top of the card between his thumb and forefinger and remove it from its slot.

Figure 31:
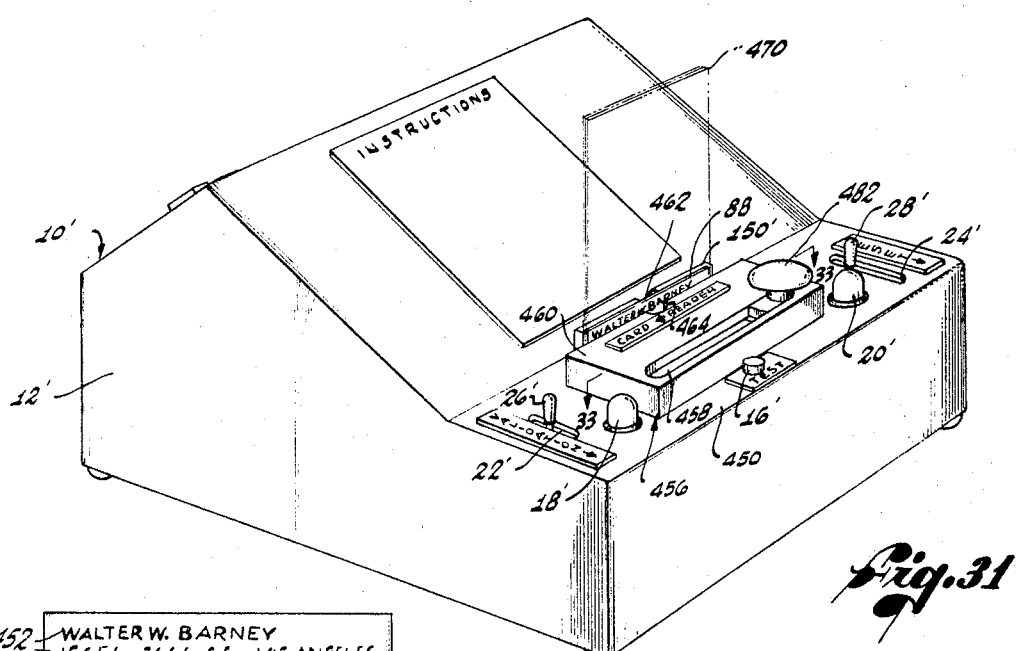
FIGURE 31 is a perspective view of validator apparatus as in FIGURE 1, but wherein print-out means are employed for impressing embossed information on the card onto paper on which an order has been written up.
Figure 32:
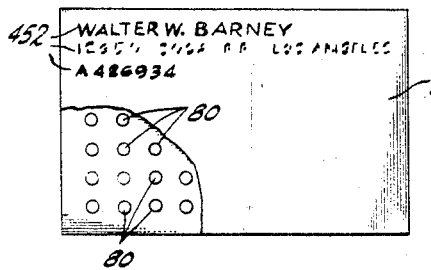
FIGURE 32 is a plan view of a credit card of my invention showing embossed information thereon which is to be impressed upon the paper.
Figure 33:
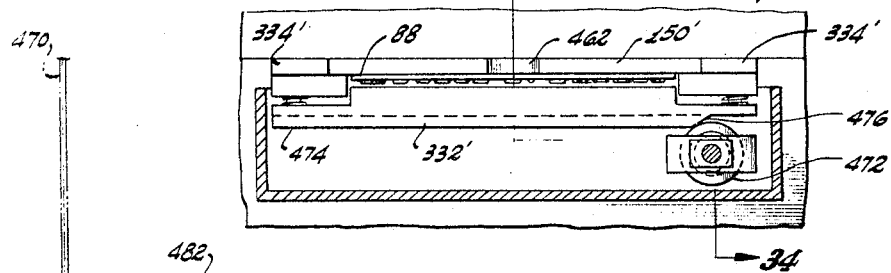
FIGURE 33 is a fragmentary sectional view of the print-out mechanism taken along the lines 33—33 of FIGURE 31.

As shown, when the card 88 is placed in its slot, the embossed portion 452 of the card faces the open edge of the housing 456. The movable plate 332' is sufficiently spaced from the card 88 to permit a sheaf 470 of carbonized papers to be inserted between the card and the movable plate 332'. As shown in FIGURE 31, the sheaf extends above the card 88.

The sheaf 470 is pressed against the embossed portion 452 of the card, thereby to imprint the embossed information on each page of the sheaf. To this end, the housing 456 supports a roller 472 which is adapted to be carried along the slot 458 and press the plate 332' inwardly with sufficient force to cause the sheaf 470 to be impressed with the embossed information. In this latter connection, when the validation check lever 22' is pulled, the string bias on the plate 332' (see FIGURES 26 and 27) is not sufficient to cause the embossed portion of the card to be imprinted on the sheaf 470.

To so imprint the sheaf, the plate 332' is provided with a rib 474 in the path of the roller 472, and which at one end has a tapered surface 476. The roller 472 is normally positioned at one end of the housing 456, wherein it rests against the tapered surface 476 (see FIG. 33).

Figure 34:
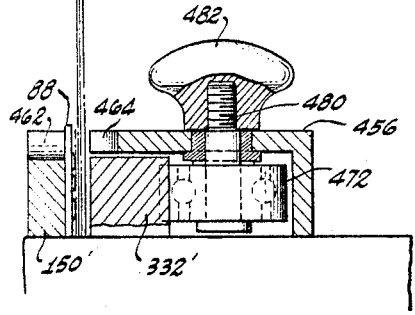
FIGURE 34 is a fragmentary sectional view taken along the lines 34—34 of FIGURE 33.

As best seen in FIGURE 34, the roller 472 may be a ball bearing, the inner race of which is secured on a pin 480 that has a threaded end extending through the slot 458. A knob 482 is threaded on the upper end of the pin 480. When the knob is shoved along the slot (from right to left in FIGURES 31 and 33), the roller 472 cams the plate 332' inwardly, and thereby clamps the sheaf 470 against the embossed portion 452 of the card with the force needed to print the embossed information on all pages of the sheaf.

It will now be apparent why it is desired that operation of the validation check lever does not exert enough force on the plate 332' to print the embossed information on the sheaf. If the red lamp 20' is illuminated, it is not desired to print out such information. Therefore, it is only when he sees that the green lamp alone is illuminated that the clerk is apprised that he can safely operate the knob and print out the embossed information. Further in accordance with my invention, the print-out mechanism may be electromechanically latched, to be released only when the green lamp alone is illuminated. Also, the print-out mechanism may be operated automatically through suitable control circuitry, which may, for example, include a solenoid to be energized upon green lamp operation to force the knob 482 in the direction for a print-out.

My invention also embraces a data processing system incorporating the previously described components. For example, validators at widely spaced locations may have their magnet switches and manually controlled switches connected to a remote central computer station. When a card at any location is to be checked, operations of these switches are matched at the computer station with previously stored information about the particular card and customer, and signals are transmitted to that location which advise the action to be taken for the particular transaction.

In this latter connection, the pushbutton switches alone may be used to obtain a check on the name of the customer. For example, a customer may claim the card he has is the one issued to him. There may be a possibility that such a card has been tampered with, e.g., has had a magnet reversed in polarity so as to upset the code of the card. To clarify that this customer is the owner of the card, he can be asked to operate the pushbuttons in accordance with his pushbutton code. Thereupon, the computer matches the coded sequence of the pushbutton switches with information concerning the name of the person with that code, and furnishes printed information, e.g. Teletype, giving the name of the individual that matches that code. If the name matches that on the card, the customer can be provided with the goods or services he wants, with a minimum of embarrassment to the customer and seller, but with substantial assurance for the seller that the customer is who he says he is. If the names do not match up, suitable action can be taken to avoid furnishing goods or services sought to be obtained through fraud.

As previously indicated, validator apparatus of my invention can accommodate millions of coded cards. The card may include many more magnets in a row and/or many more rows of magnets than shown. In such case there are provided like spaced magnet switches connected to respective manually operable switches. The number of pushbuttons corresponds to the number of manually operable switches in a row. But for any given number of manual switches in a row, and corresponding pushbuttons, it will be apparent that with many rows of manual switches, the same pushbuttons are used to operate a switch in each.

Any given arrangement is also increased in capacity by operating more than one manual switch in one or more rows (in addition to operating only one in each row). In the apparatus shown, two or more manual switches in the last row may be operated by the customer.

Alternatively, separate levers may be provided for moving the bar 240 and for clearing the rods 184 (i.e., returning the rods 184 to their upper positions). After the bar is stepped along the rows as already described, the bar return lever is pulled to return the bar to a position over one of the rows of rods, and further pushbuttons are actuated to step the bar again. For example, the bar may be returned to the second row, from which three more pushbuttons are operated in moving the bar to the position in which the validating check lever is operated. If the customer's pushbutton code is 0989427, the first traverse of the bar 240 is effected by pressing the "0," "9," "8," and "9" pushbuttons. Pulling the validating check lever at this point causes both red and green lamps to be illuminated. Then, after moving the bar to the second row of rods 184, the "4," "2" and "7" pushbuttons are pressed to again move the bar to the last position. Only after this entire sequence of pushbuttons is pressed is the green lamp alone illuminated when the validating check lever is pulled. Before the next card is inserted, the clearing lever is pulled to force the rods 184 back to their upper positions, and the bar control lever is pulled to move the bar to its starting position.

In this last arrangement, two (or more) pushbuttons may be pressed simultaneously in each position of the bar. By such means, in addition to validating cards by operating one manual switch in each row, the capacity of the system is vastly increased.

In the preceding examples, the bar may be motor driven. For instance, a step retracing sequence may be effected by driving the bar from its last position to a preceding position, at which it is released to permit further pushbutton operations to again step the bar along as described.

In all the above-described operations, it should be apparent that the wiring is properly made to effect validation of cards by pushbutton codes assigned or corresponding thereto. The cards and magnet switches, of course, are appropriately coded so the card operates magnet switches that cooperate with manually operated switches to establish the requisite circuit connections for operating the green lamp.

Furthermore, it will be apparent that my invention embraces the use of manually operable switches other than the single-pole, double-throw switches shown and described herein. Multiple pole switches, as well as single-pole, multiple-throw switches may be used, in which case the circuit means employed is, of course, correspondingly more detailed. And for relatively simple arrangements, it is of course possible to use single-pole, single-throw switches.

While the invention has been described with reference to a row of spring-biased pushbuttons, it is apparent that the manual switches may be operated by other means. For example, the manual switches may be operated by telephone-type buttons. The buttons may stay depressed until released by a suitable release mechanism. The buttons may be arranged in the manner of those of an adding machine, and adapted through suitable connections to operate the manual switches.

In addition to the foregoing, my validator invention accommodates two or more credit cards simultaneously. In this connection, assume that two cards are provided, wherein each has magnets embedded therein. When both cards are stacked and placed adjacent the reader plate, magnets in both cards cooperate to operate magnet switches from which circuit connections are established to show the composite card code is authentic. Thus, the code is split bewteen the two cards. Such an arrangement is ideal for a security system. For example, a team of three men may have to enter a restricted area together. The door must be unlocked with magnet cards. Each of their cards has only part of the necessary code. Their three cards must be stacked and placed next to the reader plate, to operate the necessary magnet switches and associated circuitry that actuates the door-opening mechanism.

It should also be noted, that my invention may be readily adapted to operate other devices than lamps, printout mechanisms or doors, e.g., to release gates or turnstiles at a manufacturing facility. Further, the circuit means may include electro-optical means, e.g., optical fibers or photoelectric devices, and solid state components as desired.

I claim:
1. In combination:
a housing having a slot to receive a card having a plurality of magnetized portions, wherein a line through the poles of each portion is perpendicular to a face of the card, the positions of said portions being unmarked and not visible, said card being characterized in that at said face the poles of all but a predetermined number of said portions are distributed in accordance with a master pattern, the poles of said predetermined number at said face constituting one of a plurality of card codes;
a plurality of magnet responsive devices positioned to one side of said slot,
a card placed in the slot with said face fronting said one side having each magnetized portion aligned with a respective device; signal developing means;
and a network between said signal developing means and said devices, and operable from the responses of those devices with which are aligned poles of a card constituting any of said card codes, to effect operation of said signal developing means to provide information identifiable with the card.

2. The combination of claim 1, further including a plurality of manually operable selectors, said selectors being operable in a respective sequence for each card code, wherein neither the coded card portions nor the devices with which they are aligned are identifiable from the selectors or selector sequence; and
means in said network to effect operation of said signal developing means when the selectors are operated in the sequence for the card placed in the slot.

3. The combination of claim 2, wherein the number of said selectors is a submultiple of the number of said devices.

4. The combination of claim 2, wherein said devices are magnetically operable switches, each having a movable contact carried by a magnet, and wherein said selectors are manually operable switches, said magnetically and manually operable switches being the same in number and arranged in a plurality of rows.

5. The combination of claim 4, wherein said selectors include pushbuttons equal in number to the number of manually operable switches in a single row;
and sequentially operable means controlled by said pushbuttons to effect operation successively of one manually operable switch in each row upon operation of successive pushbuttons.

6. The combination of claim 5, wherein said magnetized card portions are formed of axially poled disc magnets embedded in the card.

7. The combination of claim 4, wherein each magnetically operable switch includes a movable permanent magnet and fixed contacts, each movable magnet carrying contact means for bridging the associated fixed contacts, the coded card portions being in polarity repelling relation with the corresponding movable magnets so as to move them to positions for bridging the associated fixed contacts, the remaining magnetized portions and corresponding movable magnets being in polarity attracting relation to cause such remaining movable magnets to be held in positions so their associated fixed contacts are not bridged.

8. The combination of claim 5, wherein said manually operable switches have movable contacts normally positioned to be actuated by said pushbuttons, said sequentially operable means including a movable bar of sufficient length to span a row of said movable contacts, said bar being selectively positionable over any row of said movable contacts;

spaced plunger elements carried by said bar, each plunger element being aligned with a respective movable contact in each row of movable contacts adjacent which said bar is placed;

respective bars carried by said pushbuttons and adapted to engage a respective plunger element in any position of said movable bar;

means for stepping said movable bar to a different row of movable contacts each time a pushbutton is actuated to press its associated plunger element and operate a movable contact aligned therewith;

and a clearing member having portions adapted to engage all actuated movable contacts simultaneously and return them to their normal positions.

9. The combination of claim 7, including a plate having a plurality of openings therethrough, said movable magnets being cylindrical elements axially slidable in said openings, said movable magnets being axially poled.

10. The combination of claim 9, wherein said movable magnets and the walls of said openings are coated with conductive material, said plate being metal, and portions of said plate surrounding said movable magnets being nonmagnetic, said movable magnets being aligned with said disc magnets when the card is placed against one surface of said plate, each movable magnet that is moved by a disc magnet extending past the opposite surface of said plate, said plate constituting a fixed contact of each pair associated with each movable magnet;

a nonconductive plate supporting a plurality of fixed contacts aligned with said movable magnets, and each constituting the remaining contact of the pair to be bridged by the associated movable magnet, each movable magnet extending past said opposite surface of said plate engaging the fixed contact aligned therewith;

a sheet of nonconductive material between said plates, said sheet having openings therein of smaller size than the adjacent fixed contacts, each fixed contact being on the axis of a respective opening in said sheet;

and means holding said plates and sheet together with said fixed contacts in abutment with said sheet.

11. The combination of claim 9, including magnet attracting means supported by said plate in the vicinity of each movable magnet to normally position the movable magnets within said plate so that said contacts carried thereby do not bridge the associated fixed contacts.

12. The combination of claim 10, wherein said one surface of said plate contains respective grooves surrounding said openings;

and a ring of magnet attracting material deposited in each groove, each such ring associated with a movable magnet extending past said opposite surface of said plate being effective, upon removal of said card from said one surface, to draw the extended magnet back into said plate.

13. The combination of claim 9, including a nonmagnetic plate having a plurality of openings therethrough;

a respective evacuated housing in each opening, the respective movable magnets being in one end of each housing, the fixed contacts associated with each movable magnet extending into the other end of its housing, one contact of each pair being conductively connected together, said card being positionable adjacent one surface of said plate to align said disc magnets with said movable magnets, said one end of each housing being adjacent said one surface.

14. The combination of claim 13, including a ring of magnet-attracting material surrounding said one end of each housing, each such ring normally attracting the associated movable magnet to a position wherein the contact carried thereby does not engage the fixed contacts in its housing.

15. The combination of claim 1, wherein each card has information embossed thereon;

and means carried by said housing for printing the embossed information on paper placed against the card.

16. The combination of claim 15, further including means to prevent operation of said printing means until after operation of said signal developing means.

17. In combination:

a housing having a slot to receive a card having a plurality of magnetized portions, wherein a line through the poles of each portion is perpendicular to face of the card, the positions of said portions being unmarked and not visible, said card being characterized in that at said face the poles of all but a predetermined number of said portions are distributed in accordance with a master pattern, the poles of said predetermined number at said face constituting one of a plurality of card codes;

a plurality of magnet responsive devices positioned to one side of said slot, a card placed in the slot with said face fronting said one side having each magnetized portion aligned with a respective device;

a plurality of manual operable selectors, the number of said selectors being a submultiple of the number of said devices, said selectors being operable in a respective sequence for each card code;

and a network operable from the devices aligned with the coded card portions, and from operation of the selectors in the sequence associated with the card in the slot, to provide information identifiable with the card.

18. The combination of claim 17, further including means controlled by said network for printing information identifiable with the card.

19. The combination of claim 18, wherein said network includes means for storing information identifiable with the card;

and means for printing such information upon operation of said network.

20. The combination of claim 7, wherein said manually operable switches are arranged in two pairs of rows, each switch having a single pole to engage one or the other of a pair of fixed contacts, all said one fixed contacts in all rows being directly connected;

a respective direct connection in each row to all said other fixed contacts therein;

a respective resistor connected to each said respective direct connection, each of said resistors having the same value of resistance, two of said resistors being directly connected and the remaining two resistors being directly connected;

a pair of relays, each having a coil and a normally open switch to be closed when its coil is energized, one coil being connected at one end to the junction of one pair of resistors, the other coil being connected at one end to the junction of the other pair of resistors, the remaining ends of said coil being connected together;

a lamp, said lamp and said normally open relay switches being connected in series between the junction of said coils and a point of reference potential;

a source of D-C voltage;

a normally open switch for connecting said voltage source between the junction of said coils and the point of reference potential, wherein said magnetically operable switches are normally open switches, each having a movable magnet contact connected to the point of reference potential and a fixed contact connected to a respective pole of one of said manually operable switches;

and a second lamp connected between the junction of said coils and one fixed contact of one of the manually operable switches.

21. The combination of claim 20, wherein said manually operable switches and connections to the fixed contacts thereof include:

an elongated block of insulating material;

spaced parallel openings through said block;

an elongated conductive rod in each opening, each rod having a flange at each end to engage the adjacent surface of the block, said rods being of equal length and of greater length than said openings;

said block having rows of openings on opposite surfaces which extend to and are transverse to the openings in which said rods are located, the axes of said rows of openings being in parallel planes;

and a respective bus on each surface of the block in which said transverse openings are located, each bus having a plurality of integral spring contacts, the ends of the spring contacts of each bus extending into respective transverse openings, and each rod being shaped so that when one flange engages the block, one spring contact engages the rod and the other does not, and when the other flange engages the block said other spring contact engages the rod and said one contact does not.

22. The combination of claim 20, wherein spaced conductive elements are secured to the block on one of the surfaces through which the rods extend, each conductive element being in continuous rubbing engagement with a respective rod.

23. The combination of claim 20, wherein each conductive element has an end portion extending into a respective opening and frictionally contacting the rod therein.

References Cited

UNITED STATES PATENTS

| | | | |
|---|---|---|---|
| 2,714,201 | 7/1955 | Whitehead | 340—149 |
| 3,015,087 | 12/1961 | O'Gorman | 340—149 |
| 3,274,352 | 9/1966 | Ryno et al. | 340—149 X |

JOHN W. CALDWELL, *Primary Examiner.*

H. I. PITTS, *Assistant Examiner.*

U.S. Cl. X.R.

200—46